US 9,230,438 B2

(12) United States Patent
Barrett

(10) Patent No.: US 9,230,438 B2
(45) Date of Patent: Jan. 5, 2016

(54) VEHICLE LOCATION AND ACTIVITY SHARING

(71) Applicant: CLOUDCAR, INC., Los Altos, CA (US)

(72) Inventor: Peter Barrett, Palo Alto, CA (US)

(73) Assignee: CLOUDCAR, INC., Mountain View, CA (US)

( * ) Notice: Subject to any disclaimer, the term of this patent is extended or adjusted under 35 U.S.C. 154(b) by 83 days.

(21) Appl. No.: 13/735,880

(22) Filed: Jan. 7, 2013

(65) Prior Publication Data
US 2014/0191886 A1 Jul. 10, 2014

(51) Int. Cl.
G08G 1/123 (2006.01)
G08G 1/01 (2006.01)
G08G 1/00 (2006.01)
G01S 5/00 (2006.01)

(52) U.S. Cl.
CPC .............. *G08G 1/123* (2013.01); *G08G 1/0112* (2013.01); *G08G 1/20* (2013.01); *G01S 5/0027* (2013.01)

(58) Field of Classification Search
CPC .............................. G08G 1/123; H04W 64/00
USPC ........................................................ 340/989
See application file for complete search history.

(56) References Cited

U.S. PATENT DOCUMENTS

| 8,571,724 | B2* | 10/2013 | Brennan et al. ................... 701/1 |
| 2006/0074552 | A1* | 4/2006 | Naito et al. .................... 701/211 |
| 2006/0244592 | A1* | 11/2006 | Kansala et al. ............... 340/571 |
| 2007/0296559 | A1* | 12/2007 | Fehr ............................ 340/426.2 |

* cited by examiner

Primary Examiner — Kerri McNally
(74) Attorney, Agent, or Firm — Maschoff Brennan

(57) ABSTRACT

Vehicle location sharing systems and methods are described. In an embodiment, a system for sharing a location of a vehicle may include a location-determining device and a network-connected device. The location-determining device may be configured to track a location of a vehicle and to determine a location of the vehicle in response to a voice command from an occupant of the vehicle. The network-connected device may be configured to transmit a location description in response to the voice command. The location description may be configured to identify the determined location of the vehicle.

24 Claims, 4 Drawing Sheets

VEHICLE LOCATION AND ACTIVITY SHARING

BACKGROUND

1. Field

The embodiments discussed herein relate to systems and methods of sharing a location or activity of a vehicle.

2. Relevant Technology

Mobile electronic devices ("mobile devices") allow users to share information with others, among other things. Generally, mobile device users can share text-based messages with other mobile device users via short message service (SMS) messages. In many instances, mobile devices allow users to share other forms of media directly with other mobile devices through multimedia messaging service (MMS) messages. As many mobile devices are configured to access the internet, users may share text, hyperlinks, pictures, videos, audio and the like on a number of internet-based mobile device applications, blogs, microblogs, social networking services, photo sharing sites, video sharing sites, social news sites, and the like.

Vehicle operators often desire to use their mobile device while operating a vehicle. However, the use of electronic devices while operating a vehicle can lead to operator distractions and potentially dangerous operating conditions. This sort of "distracted driving" has caused accidents, and many states now have laws forbidding or restricting interaction with mobile devices while driving.

Furthermore, the National Highway Traffic Safety Administration (NHSTA) has provided guidelines to automakers to ensure that new cars discourage distracted driving. The focus of the NHSTA guidelines is to encourage drivers to keep their eyes on the road, rather than being distracted with the interface of a mobile device or vehicular device. To that end, some sharing functionality of electronic devices may potentially be disabled now and possibly in a more widespread manner in the future. The NHSTA guidelines are often in direct conflict with drivers' desired behavior.

The subject matter claimed herein is not limited to embodiments that solve any disadvantages or that operate only in environments such as those described above. Rather, this background is only provided to illustrate one example technology area where some embodiments described herein may be practiced.

SUMMARY

Some embodiments described herein generally relate to systems and methods of sharing a location or activity of a vehicle. The systems and methods may allow an occupant of a vehicle to share the vehicle's location by way of simple inputs, such as voice commands or button presses. The vehicle's location can thus be easily and safely shared, even by the vehicle's operator. The vehicle's location may be shared through many forms of communication accessible via the internet and/or radio access networks. For example, a vehicle's location may be shared through SMS messages, MMS messages, email, and internet-based applications and/or websites such as Twitter, Facebook, and the like. The systems and methods may further allow the vehicle's occupants to add supplemental information to the shared location, such as current time, direction of travel, expected arrival time at destination, comments, traffic information, etc. A visual or audible indication may be generated so that the vehicle's occupants can safely confirm that the location has been shared.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a system for sharing a location of a vehicle is described. The system includes one or more electronic devices. The one or more electronic devices are configured to determine a location of the vehicle in response to an input from an occupant of the vehicle. The one or more electronic devices are also configured to transmit a location description in response to the input. The location description is configured to identify the determined location of the vehicle.

In another example embodiment, a method of sharing a location of a vehicle is described. The method includes determining a location of the vehicle in response to an input from an occupant of the vehicle. The method also includes transmitting a location description in response to the input. The location description is configured to identify the determined location of the vehicle.

In yet another example embodiment a computer-readable medium is described. The computer-readable medium has computer instructions stored thereon that are executable by a processor to perform operations. The operations include determining a location of the vehicle in response to an input from an occupant of the vehicle. The operations also include transmitting a location description in response to the input, the location description configured to identify the determined location of the vehicle.

Additional features and advantages will be set forth in the description which follows, and in part will be obvious from the description, or may be learned by the practice of the embodiments. The features and advantages of the embodiments will be realized and obtained by means of the instruments and combinations particularly pointed out in the claims. These and other features will become more fully apparent from the following description and claims, or may be learned by the practice of the embodiments as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DESCRIPTION OF EMBODIMENTS

Figure 1:
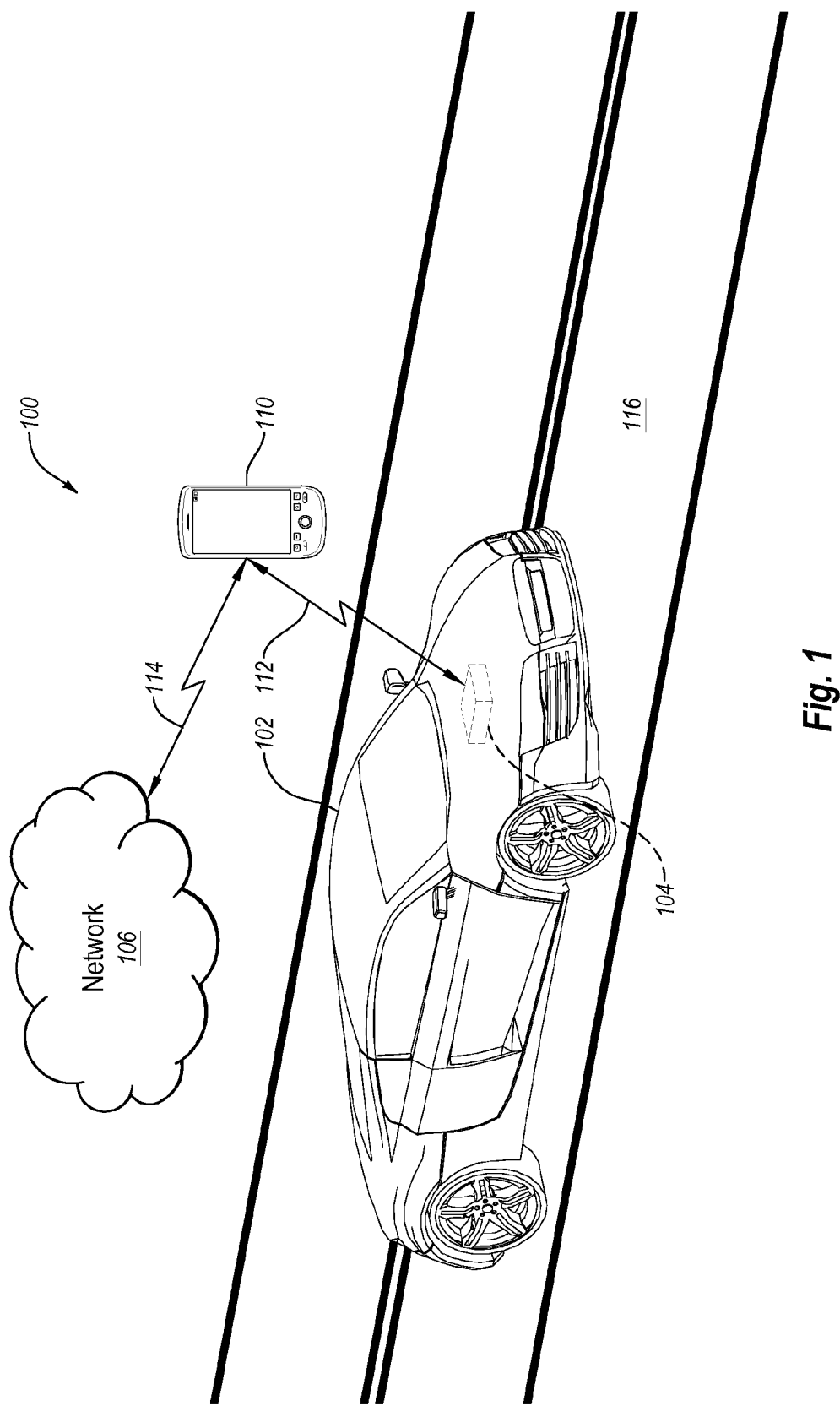
FIG. 1 is a diagrammatic view of an example operating environment including a vehicle and a mobile device.

Operators and/or occupants of a vehicle may wish to share information about their vehicle's location or activity via various technologies. Some vehicle operators may do so notwithstanding the dangers of operating a mobile device while simultaneously operating a vehicle. Other vehicle operators and/or occupants may be unable or unwilling to do so. The vehicle operators and/or occupants may be unable or unwilling to share their vehicle's location to avoid distracting the operator, because they are operating the vehicle, because a safety feature has disabled a function needed for sharing, and/or because it is illegal under the circumstances.

Often, even if it is safe and legal to share a vehicle's location, it may be inconvenient to do so. For example, using some conventional systems, a user may be required to undertake a number of steps to share the vehicle's location via a desired technology. With some systems, for instance, the user may be required to navigate one or more applications, copy and paste location information from one application to another, and/or add a description of the location.

Those vehicle operators and/or occupants who wish to share their vehicle's location in the absence of the methods and systems described herein, must weigh the risks and the inconvenience against the benefits of sharing. For example, a carpool driver may want to send the other members of the carpool an SMS message including the driver's location so the other members of the carpool know how much time will pass before the carpool arrives. Another person may be driving home for the holidays and may wish to post his location to a social networking site for hometown friends and family to see. Someone driving across the country may want to regularly broadcast current location via a microblogging site to chronicle the trip. In these and many other situations, in the absence of the methods and systems described herein, the vehicle operators may be forced to choose between not sharing the vehicle's location and sharing the location despite the accompanying inconvenience, safety risks, and/or illegality.

The methods and systems described herein enable developers to use information concerning a vehicle's location in games, social media, mobile device applications, websites, and the like, which has previously not been done because of inherent safety and/or liability concerns. As a result, there are any number of games, social media, mobile device applications, websites, or the like that can be created or adapted to use a vehicle's shared location while the vehicle is in operation and potentially moving, and which are enabled by the methods and systems described herein.

In view of the foregoing, embodiments described herein allow a vehicle's location to be shared safely, conveniently, and legally.

Reference will now be made to the figures wherein like structures will be provided with like reference designations. The drawings are diagrammatic and schematic representations of example embodiments and, accordingly, are not limiting of the scope of the claimed subject matter, nor are the drawings necessarily drawn to scale.

FIG. 1 illustrates an example operating environment 100 including a vehicle 102 and a mobile device 110. Although illustrated as an automobile, the vehicle 102 may more generally include any vehicle in which it may be desirable to share a location of the vehicle. The vehicle 102 may include a motorized vehicle such as a car, a truck a motorcycle, a tractor, a semi-tractor, an airplane, a motorized boat, or the like, or even a non-motorized vehicle such as a bicycle, a wheelchair, a sailboat, or the like—provided that suitable components may be present.

The vehicle 102 and the mobile device 110 may allow an occupant of a vehicle 102 to easily and safely share the vehicle's location 116 by way of simple inputs, such as voice commands or a simple series of button presses that can be safely made while a vehicle is in motion. As used herein, the term "occupant" broadly applies to both operators and passengers. The vehicle's location 116, optionally including supplemental information, may be shared through any appropriate network 106 accessible by the mobile device 110 or the vehicle 102. For example, the vehicle's location 116 may be shared through SMS messages, MMS messages, email, and internet-based applications and/or websites such as Twitter, Facebook, and the like. The vehicle 102 and/or the mobile device 110 may also indicate that the vehicle's location 116 has been shared so an occupant of the vehicle 102 can safely confirm that the vehicle's location 116 has been shared.

The vehicle 102 may generally include one or more devices 104 to assist with operation of the vehicle 102, to improve the vehicle's safety, to entertain occupants (not shown) of the vehicle 102, to improve the comfort of occupants, or the like. For example, the devices 104 can include an audio system for audibly providing occupants with entertainment and other information. The devices 104 can also include one or more displays for visually providing occupants with information and potentially with entertainment. The displays may include instrument panels, head unit displays, and other display devices that may be found in both new and used vehicles.

A voice-recognition system may also be included as one of the devices 104 included with the vehicle 102. The voice-recognition system may include a microphone for detecting a spoken command from an occupant. An input device, such as a switch, button, touch surface, or the like, may be included in the voice-recognition system and/or the devices 104 to receive input effective to instruct the voice-recognition system to listen for a spoken command.

The devices 104 may include a navigation system for determining a location of the vehicle 102, for providing occupants with directions to a destination, or the like. The navigation system generally relies on satellite navigation systems such as the global positioning system (GPS) or the global navigation satellite system (GLONASS). However, other satellite navigation systems can be used, as can terrestrial navigation systems such as the long range navigation (LORAN) system, Wi-Fi-based positioning system (WPS), and the like. The navigation system may provide information to occupants via one or more displays and/or an audio system. In many cases, built-in navigation systems may include software and/or hardware that is already outdated by the time the vehicle 102 is sold to the consumer who will use the vehicle 102.

The vehicle 102 may communicate 112 with a mobile device 110. The mobile device 110 may be virtually any communication-enabled mobile device including, but not limited to, a portable media device, a personal digital assistant (PDA), a smartphone, a tablet computer, a laptop computer, or other communication-enabled mobile device. The mobile device 110 may include a communication interface such as an IEEE 802.11 interface, a Bluetooth interface, a Universal Mobile Telecommunications System (UMTS) interface, a Long Term Evolution Advanced (LTE-A) interface, or other mobile cellular interface. The mobile device 110 may wirelessly communicate 114 data, voice communication, SMS messages, or the like over the network 106. In some embodiments, the devices 104 may communicate over the network 106 via the mobile device 110.

Many consumers replace their mobile device 110 much more often than they replace their vehicle 102. The relatively short lifespan of such mobile devices 110 often provides consumers with access to the latest, or almost the latest, and most up-to-date software and/or hardware through their mobile device 110. Such mobile devices may generally operate a variety of apps, access online content, and can often interface with radio access networks.

In some embodiments, a new or used vehicle may be configured to wirelessly communicate 112 with the mobile device 110. Alternately or additionally, the vehicle 102 and the mobile device 110 may communicate 112 over a wired connection. In some embodiments, communication 112 between the vehicle 102 and the mobile device 110 may substantially occur as disclosed in U.S. patent application Ser. No. 13/664,212, entitled "AUTOMOBILE DATA ABSTRACTION AND COMMUNICATION" and filed Oct. 30, 2012, which application is incorporated herein by reference in its entirety.

The mobile device 110 may communicate with the devices 104 and the vehicle 102 generally, and may project content onto one or more displays of the vehicle 102. In some embodiments, projection of content may substantially occur as disclosed in U.S. patent application Ser. No. 13/664,204, entitled "PROJECTION OF CONTENT TO EXTERNAL DISPLAY DEVICES" and filed Oct. 30, 2012, which application is incorporated herein by reference in its entirety.

Figure 2:
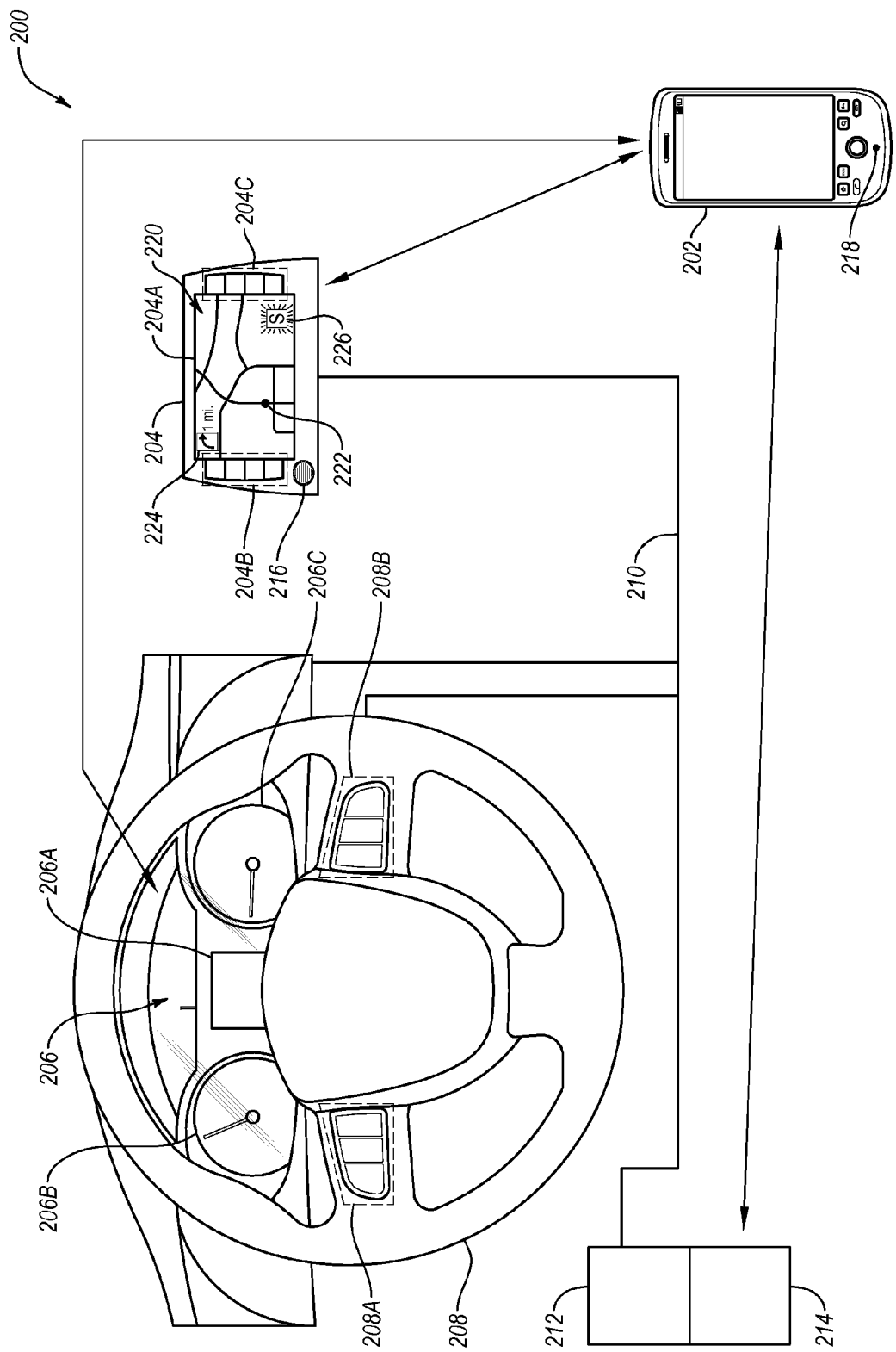
FIG. 2 is a diagrammatic view of an example location-sharing system such as may be implemented in the operating environment of FIG. 1.

FIG. 2 is a diagrammatic view of an example location-sharing system 200 such as may be implemented in the operating environment 100 of FIG. 1. The system 200 may be located within the interior of a vehicle that may generally correspond to the vehicle 102 of FIG. 1. The system 200 includes a mobile device 202 that may generally correspond to the mobile device 110 of FIG. 1. The system 200 may include one or more vehicular display devices 204 and 206. More particularly, the vehicular display devices 204 and 206 respectively include a head unit 204 and an instrument panel 206 in the illustrated embodiment. The vehicular display devices 204 and 206 are generally vehicular display devices that can be found in new and used vehicles. The principles and operation of the embodiments of the invention described herein can be adapted for use with existing vehicular display devices and generally do not require the cooperation of the vehicle manufacturer. In some cases, the existing vehicular display devices 204 and 206 can be equipped or retrofitted with a wireless interface or other communication device as further described herein to facilitate communication with mobile device 202. In other cases, the vehicular display devices 204 and 206 included in new vehicles are adapted by the manufacturer to facilitate the communication.

The head unit 204 includes a display 204A configured to display content such as one or more of maps 220, navigation instructions 224, video content from an integrated DVD player, radio or other music information, weather or traffic information, etc. For example, the display 204A may be associated with an existing built-in electronics system that has certain functionality, which is often limited or outdated in the absence of the systems described herein. The head unit 204 additionally includes an input interface, which may include any input device configured to receive user input effective to operate the head unit 204 and potentially other aspects of the vehicle in which the head unit 204 is installed. For example, the input interface of the head unit 204 includes one or more buttons 204B, 204C and/or the display 204A itself when implemented as a touchscreen display. In some embodiments, when the mobile device 202 is projecting content to the head unit 204, user input provided via the input interface of the head unit 204 is used to control operation of the mobile device 202.

The instrument panel 206 includes at least one display area 206A in which content may be displayed. Accordingly, the mobile device 202 may project content to the instrument panel 206 for display in all or a portion of the display area 206A. Alternately or additionally, the instrument panel 206 may further include one or more fixed instruments 206B and 206C. For example, the fixed instruments 206B and 206C may include a speedometer, a fuel gauge, a temperature gauge, an RPM gauge, or the like or any combination thereof. Although not shown, in some embodiments, the instrument panel 206 may include an input interface such as has been described with respect to the head unit 204.

The system 200 may further include a steering wheel 208 of the vehicle. In some embodiments, the steering wheel 208 includes an input interface such as has been described above with respect to the head unit 204. The input interface of the steering wheel 208 may include one or more buttons 208A and 208B. In some embodiments, the buttons 208A and 208B are used for one or more of prompting the vehicle to listen for a voice command, speaker volume control, channel selection, track selection, or for other functionality.

In some embodiments, the system 200 further includes an intra-vehicle bus 210 to which the head unit 204, the instrument panel 206 and/or the steering wheel 208 are communicatively coupled. The intra-vehicle bus 210 may be configured to allow microcontrollers such as may be implemented in each of the head unit 204, the instrument panel 206 and the steering wheel 208, to communicate with each other. The intra-vehicle bus may include a controller area network (CAN) bus or any bus used in a vehicle for communicating signals between components, including standards such as media oriented systems transport (MOST), local interconnect network (LIN), Inter-Integrated Circuit ($I^2C$), Ethernet, or the like.

An access node 212 may be provided to allow access to the intra-vehicle bus 210. For example, an intra-vehicle bus interface (IVBI) device 214 may be communicatively coupled to the access node 212 to read data from and/or write data to the intra-vehicle bus 210. In an example embodiment, the access node 212 may include an on-board diagnostics (OBD) connector compliant with a particular OBD interface, such as the OBD-I, OBD-1.5, or OBD-II interfaces. The IVBI device 214 may be configured to communicate with the mobile device 202 wirelessly or via a hardwired connection.

In some embodiments, user input entered via the buttons 208A and 208B of the steering wheel 208 and/or entered via other input interfaces of the vehicle may be used to control operation of the mobile device 202. For example, data representing the user input may be communicated on the intra-vehicle bus 210, read by the IVBI device 214, and communicated by the IVBI device 214 to the mobile device 202 either wirelessly or via a hardwired connection.

The system 200 may continuously track a location of the vehicle. In some embodiments, the location of the vehicle is tracked by the mobile device 202. The mobile device 202 may also display a map 220 on the display 204A. The mobile device 202 may also display a marker 222 showing the location of the vehicle on the map 220, and/or navigation instructions 224. Alternately or additionally, a navigation device of the vehicle may track the vehicle's location, display the map 220, marker 222, and/or navigation instructions 224 on the display 204A. The system 200 may optionally track the location of the vehicle intermittently, rather than continuously. For example, the system 200 may be configured to track the vehicle's location only when necessary to perform some task.

The system 200 may include one or more microphones 216 and 218. The system 200 may use the microphones 216 and 218 to process voice commands of an occupant of the vehicle. In some instances, the system 200 listens for a voice command only after an appropriate button is pressed. The system 200 may alternately listen for a voice command continuously.

The system 200 shares the vehicle's location upon receiving an appropriate input from an occupant of the vehicle. The input may include a voice command, a press of a button 204B, 204C, 208A and 208B (also referred to herein as a "button press"), a touchscreen input, a combination of inputs, or the like. Upon receiving the input, the system 200 may determine a location of the vehicle. The mobile device 202 can determine the location, as can a navigation device of the vehicle. In some embodiments, the mobile device 202 may determine the location using the vehicle's navigation device via the intra-vehicle bus 210. Alternately or additionally, the vehicle may determine the location using the mobile device's navigation device via the intra-vehicle bus 210. The location may be a discrete location determined for the purpose of sharing. It will be appreciated that the system 200 may also track a series of discrete locations and generate a location description from the series of discrete locations. For example, the location description may include a description of a particular path of travel.

In response to the occupant's input, the system 200 may generate a location description from the determined location. The location description may include information that identifies the location. For example, the location description may include a textual description of the location, such as a street address, latitude and longitude, town, neighborhood, city, state, or the like. Alternately or additionally, the location description may include a graphical description of the location, such as a photo taken from the location, a map, or a satellite image. Alternately or additionally, the location description may include textual or graphical descriptions of nearby businesses, landmarks, or the like. For example, if the location is identified as being somewhere along the length of the Golden Gate Bridge in San Francisco, Calif., the location description may simply describe the location as the "Golden Gate Bridge," or may include a photo of the Golden Gate Bridge. In some embodiments, the location description may include a link to an internet location including any of the described information. For example, the location description may include a link that directs a user to an online map including the location, to an information page about the location, or the like.

In addition to a description of the location, the location description can optionally include supplemental information. The location description generally includes supplemental information identifying characteristics of the vehicle. For example, the supplemental information may include the vehicle's make, model, year, and the like. The supplemental information may also include a nickname assigned to the vehicle. For example, the location description may be a textual message stating, "The Stevemobile is at 1820 Highland Drive." The supplemental information may also include a picture not related to the vehicle's location, such as a picture of the vehicle, a picture of the vehicle's owner, a business logo, or the like.

The supplemental information can include a time the vehicle was at the described location, a heading of the vehicle, or other details. If the system 200 is aware of the vehicle's destination, the supplemental information may include the destination and the expected time of arrival. The supplemental information may also include a message, such as a textual message or an audio message. In some embodiments, the message may be recorded from and/or transcribed from a voice input from an occupant of the vehicle. The supplemental information may also include video, links to internet locations, tags of the vehicle's passengers, and the like.

The system 200 may further transmit the location description in response to the occupant's input. The location description may be transmitted by the mobile device 202 over a network generally corresponding to the network 106 described with reference to FIG. 1. It will be appreciated that the location description may be transmitted by a vehicle device and/or by an IVBI device 214 with network access capabilities.

The system 200 may transmit the location description to a receiving system (not shown). For example, the system 200 may transmit the location description to another mobile device via SMS message, MMS message, or the like. The location description may be transmitted to an email address and/or to a site accessible via the internet. The location description may be transmitted to sites accessible via internet browsers, or by applications located on computers and/or mobile devices. For example, the location description may be transmitted to a blog or other website, such as a blog controlled by the operator or other occupant of the vehicle.

Alternately or additionally, the location description may be transmitted to social media. Particular examples of social media may include, but are not limited to, Twitter, Facebook, Tumblr, Youtube, Reddit, Pinterest, Instagram, and the like. It will be appreciated that the embodiments described herein are not limited to the social media specifically mentioned in this application, or only to currently-existing social media. The system 200 may employ an appropriate application programming interface (API) to transmit the location description. In some embodiments, the system 200 is provided the necessary permissions to transmit to the receiving systems ahead of time. For example, the system 200 may be provided with usernames, passwords and other login information ahead of transmitting to the receiving systems. Some receiving systems, particularly social media, may require the system 200 be authorized to transmit information to the receiving systems.

The occupant's input may direct the system 200 to transmit the location description to one or more particular receiving systems. For example, a user's voice input may include the phrase "Tweet my location," which may prompt the system 200 to determine the vehicle's location and transmit the location description as a Twitter message commonly described as a "Tweet." By way of further example, a user's voice input may include the phrase "Facebook my location with the message 'California or bust,'" which may direct the system 200 to transmit a location description including the vehicle's location accompanied by the supplemental message "California or bust." The user's input may also include a generic phrase such as "share my location," which may cause the system 200 to transmit a location description to a default receiving system and/or to prompt the user to identify the desired one or more receiving systems. Although described as voice commands, physical inputs may also be used. For example, a first button press may direct the system 200 to share the vehicle's location and a second button press may indicate to which one or more receiving systems the system 200 should transmit the location description.

The system 200 may indicate that the location description has been transmitted in response to the occupant's input. The system 200 may display a visual indication 226 that the location description has been transmitted to the desired receiving services. The visual indication 226 may be receiving-service specific, such as an image, logo or icon representing the receiving service. The visual indication 226 may appear on the display 204A for a period of time and disappear. Alternately or additionally, the system 200 may indicate that the location description has been transmitted through computer-generated or pre-recorded verbal feedback, by causing one or more of the displays 204A and 206A and/or a portion thereof to flash, by playing an audible indication, or the like.

Figure 3:
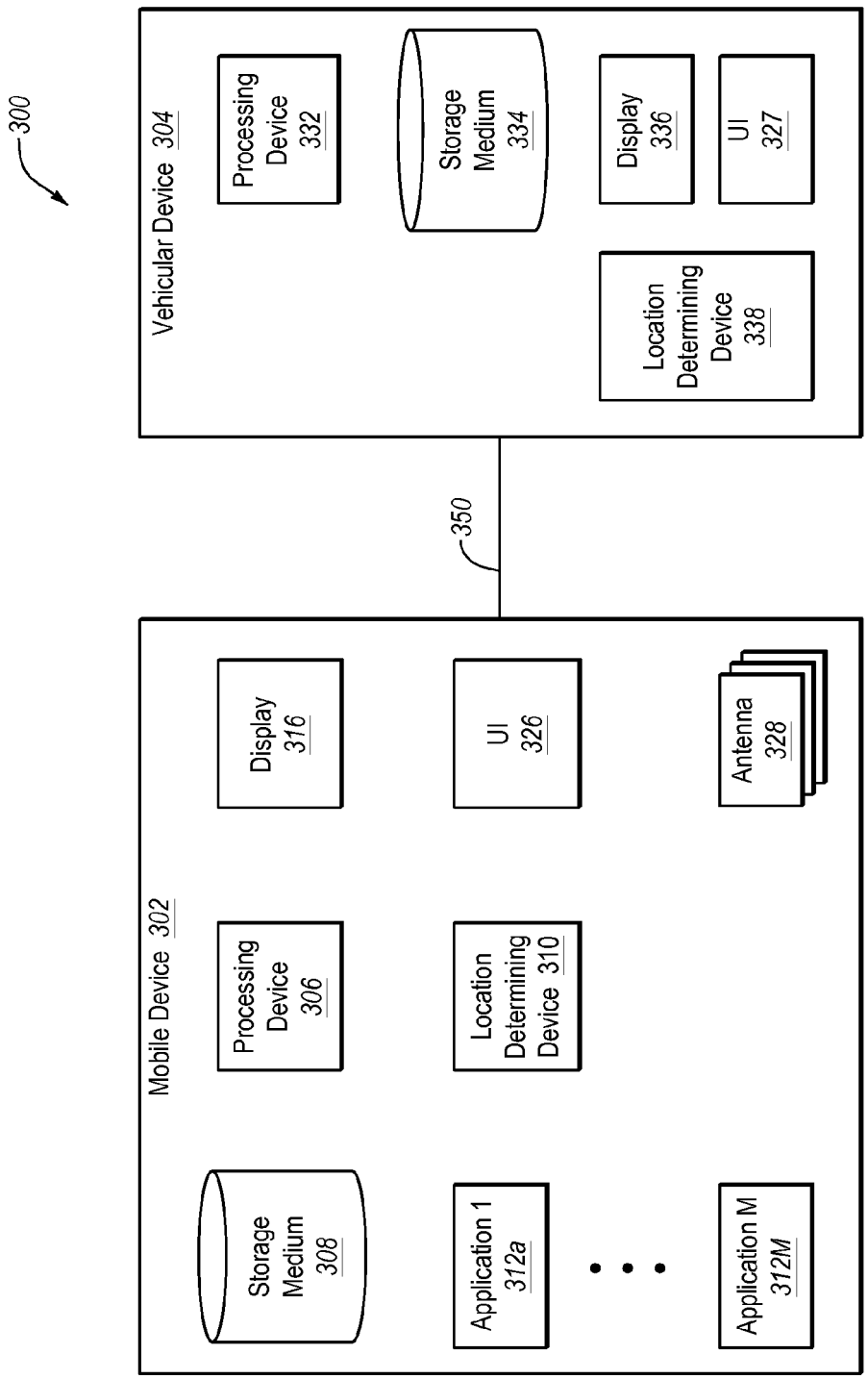
FIG. 3 is a block diagram of another example location-sharing system such as may be implemented in the operating environment of FIG. 1.

FIG. 3 is a block diagram of another example location-sharing system 300 such as may be implemented in the operating environment of FIG. 1. Additionally, the system 300 may generally correspond to the system 200 of FIG. 2. Accordingly, the system 300 includes a mobile device 302 which may generally correspond to the mobile device 110 of FIG. 1 and/or the mobile device 202 of FIG. 2. The system 300 also includes a vehicular device 304, which may generally correspond to any of the devices 104, 204 and/or 206 of FIGS. 1 and 2.

The mobile device 302 includes a processing device 306 and a computer-readable storage medium 308 (hereinafter "storage medium 308"). The processing device 306 is configured to execute computer instructions stored on the storage medium 308 to perform one or more of the operations described herein, such as operations associated with sharing a location of a vehicle.

The storage medium 308 may include, but is not limited to, a magnetic disk, a flexible disk, a hard-disk, an optical disk such as a compact disk (CD) or DVD, and a solid state drive (SSD) to name a few. Another example of a computer-readable storage medium that may be included in the mobile device 302 may include a system memory (not shown). Various non-limiting examples of system memory include volatile memory such as random access memory (RAM) or non-volatile memory such as read only memory (ROM), flash memory, or the like or any combination thereof.

One or more applications 312a-312M (collectively "applications 312") may be executed by the mobile device 302, and, more particularly, by the processing device 306. For example, the applications 312 may be stored in the storage medium 308 and executed by the processing device 306 to become corresponding instantiated applications that generate or render information or content locally or communicate information or content with an external information or content source.

The mobile device 302 may be controlled via a UI 326 of the mobile device 302. Additionally, the mobile device 302 may be configured to output content to a built-in display 316.

The mobile device 302 includes one or more antennas 328 configured for wireless communication. The antennas 328 may be configured to communicate with the vehicular device 304. For example, the antennas 328 may permit communication through a communication channel 350. In some embodiments, the communication channel 350 includes the IVBI device 214, the access node 212, and the intra-vehicle bus 210 of FIG. 2. The antennas 328 also allow the mobile device 302 to communicate over a wireless network generally corresponding to the network 106 of FIG. 1. The antennas 328 may allow the mobile device 302 to transmit location descriptions to receiving systems.

The mobile device 302 includes a location determining device 310. The location determining device 310 may include hardware and/or software necessary to determine a location of the mobile device 302. For example, the location determining device 310 may include hardware and/or software to determine a location from GPS, GLONASS, LORAN, WPS, and the like. The location determining device 310 may include other devices related to determining a location of the mobile phone 302, such as a compass, gyroscope, accelerometer, and the like.

The vehicular device 304 includes a processing device 332 and a computer-readable storage medium 334 (hereinafter "storage medium 334"). The processing device 332 is configured to execute computer instructions stored on the storage medium 334 to perform one or more of the operations described herein, such as operations associated with sharing a location of a vehicle.

The vehicular device 304 may further include a display 336 generally corresponding to one or more of the displays 204A and 206A of FIG. 2. The vehicular device 304 may be controlled via a UI 327 of the vehicular device 304. Additionally, the vehicular device 304 may be configured to output content to a built-in display 336. In some embodiments, the UI 327 of the vehicular device 304 is used to control the mobile device 302 and the mobile device 302 outputs content to the display 327 of the vehicular device 304.

Optionally, the vehicular device 304 may include a location determining device 338. The location determining device 338 may include hardware and/or software necessary to determine a location of the vehicular device 304. For example, the location determining device 338 may include hardware and/or software to determine a location from GPS, GLONASS, LORAN, WPS, and the like. The location determining device 338 may include other devices related to determining a location of the vehicular device 304, such as a compass, gyroscope, accelerometer, and the like.

Figure 4:
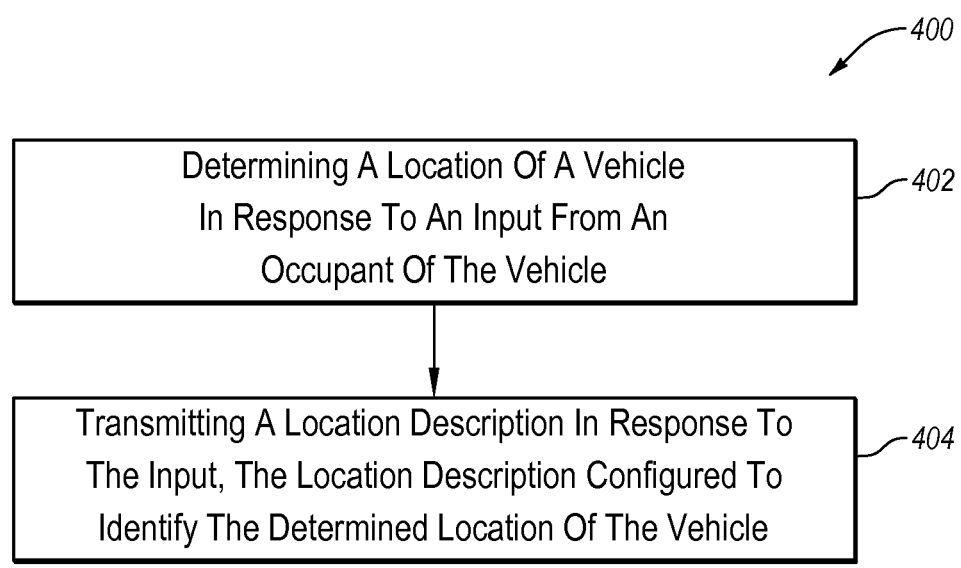
FIG. 4 is a flowchart of an example method of sharing a location of a vehicle.

FIG. 4 is a flowchart of an example method 400 of sharing a location of a vehicle. The method 400 may be implemented by a special purpose or a general-purpose computer or a system, such as the system 300 of FIG. 3. Although FIG. 4 is illustrated as discrete blocks, various blocks may be divided into additional blocks, combined into fewer blocks, or eliminated, depending on the desired implementation.

The method 400 may begin at block 402, in which a location of a vehicle is determined in response to an input from an occupant of the vehicle. In some embodiments, the input from an occupant of the vehicle may include a voice command.

In block 404, a location description configured to identify the determined location of the vehicle is transmitted in response to the input. In some embodiments, the location description may include a nickname, make or model of the vehicle. The location description may be posted to a site accessible via the internet. For example, the location description may be posted to social media. Alternately or additionally, the location description may be sent as an email message or an SMS message.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 400 may further include indicating that the location description has been successfully transmitted. In some embodiments, indicating that the location description has been successfully transmitted may include displaying a visual indication that the location description has been successfully transmitted.

An embodiment of the method 400 of FIG. 4 in the context of the system 300 of FIG. 3 will now be described. In an example embodiment, the system 300 operates as follows. An occupant of a vehicle makes an appropriate input through the vehicular device 304 UI 327 or the mobile device 302 UI 326. In response to the input, the mobile device 302 processing device 306 may execute instructions located on the storage medium 308 that direct the mobile device 302 location determining device 310 or the vehicular device 304 location determining device 338 to determine a location of the vehicle.

The processing device 306 may execute additional instructions located on the storage medium 308 that direct the mobile device 302 to generate a location description configured to identify the determined location of the vehicle and transmit the location description via one or more of the antennas 328. In some embodiments, the processing device 306 may further execute instructions that direct the vehicular device 304 display 336 to display a visual indication that the location description has been successfully transmitted.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including random-access memory (RAM), read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for sharing a location of a vehicle, the system comprising:
    an intra-vehicle bus interface device configured to communicatively couple with a mobile device and with an intra-vehicle bus of the vehicle via an on-board diagnostics connector of the vehicle, wherein the mobile device is configured to:
        determine a location of the vehicle in response to an input from an occupant of the vehicle, and
        transmit a location description in response to the input, the location description including:
            information that identifies the determined location of the vehicle, and
            an internet link corresponding to an internet location that includes information related to the determined location of the vehicle.

2. The system of claim 1, wherein the mobile device is further configured to indicate that the location description has been successfully transmitted.

3. The system of claim 2, wherein indicating that the location description has been successfully transmitted includes displaying a visual indication on a display of the vehicle to indicate that that the location description has been successfully transmitted, wherein the visual indication represents a particular service to which the location description has been successfully transmitted.

4. The system of claim 1, wherein the input includes a voice command.

5. The system of claim 1, wherein the location description further includes at least one of: a nickname associated with the vehicle, a picture of the vehicle not related to the vehicle's location, a picture of an owner of the vehicle not related to the vehicle's location, a business logo not related to the vehicle's location, and a tag of the occupant of the vehicle.

6. The system of claim 1, wherein transmitting the location description includes posting the location description to a site accessible via the internet.

7. The system of claim 1, wherein transmitting the location description includes posting the location description to social media.

8. The system of claim 1, wherein transmitting the location description includes sending the location description as at least part of an email message or a short message service (SMS) message.

9. A method of sharing a location of a vehicle, the method comprising:
    receiving an input from an occupant of the vehicle via an input interface of the vehicle;
    communicating the input to a mobile device via an intra-vehicle bus interface device communicatively coupled to an intra-vehicle bus of the vehicle via an on-board diagnostics connector of the vehicle;
    determining, via the mobile device, a location of the vehicle in response to the input; and
    transmitting, via the mobile device, a location description in response to the input, the location description including:
        information that identifies the determined location of the vehicle, and
        an internet link corresponding to an internet location that includes information related to the determined location of the vehicle.

10. The method of claim 9, further comprising indicating that the location description has been successfully transmitted.

11. The method of claim 10, wherein indicating that the location description has been successfully transmitted includes displaying a visual indication on a display of the vehicle to indicate that the location description has been successfully transmitted, wherein the visual indication represents a particular service to which the location description has been successfully transmitted.

12. The method of claim 9, wherein the input includes a voice command.

13. The method of claim 9, wherein the location description further includes at least one of: a nickname associated with the vehicle, a picture of the vehicle not related to the vehicle's location, a picture of an owner of the vehicle not related to the vehicle's location, a business logo not related to the vehicle's location, and a tag of the occupant of the vehicle.

14. The method of claim 9, wherein transmitting the location description includes posting the location description to a site accessible via the internet.

15. The method of claim 9, further comprising transmitting supplemental information regarding the vehicle, including at least one of:
   current time;
   direction of travel;
   destination;
   expected arrival time at destination;
   user comments;
   traffic information;
   audio message;
   video; and
   picture.

16. The method of claim 9, wherein transmitting the location description includes posting the location description to social media.

17. The method of claim 9, wherein transmitting the location description includes sending the location description as at least part of an email message or a short message service (SMS) message.

18. A non-transitory computer-readable medium having computer instructions stored thereon that are executable by a processing device to perform operations comprising:
   receiving an input via an intra-vehicle bus interface device communicatively coupled to an intra-vehicle bus of a vehicle, the input generated by an occupant of the vehicle via an input interface of the vehicle;
   determining a location of the vehicle in response to the input;
   transmitting a location description in response to the input, the location description including:
      information that identifies the determined location of the vehicle,
      an internet link corresponding to an internet location that includes information related to the determined location of the vehicle, and
      a tag of the occupant of the vehicle; and
   displaying a visual indication on a display of the vehicle to indicate that the location description has been successfully transmitted, wherein the visual indication represents a particular service to which the location description has been successfully transmitted.

19. The non-transitory computer-readable medium of claim 18, wherein the location description further includes a nickname associated with the vehicle.

20. The non-transitory computer-readable medium of claim 18, wherein transmitting the location description includes posting the location description to a site accessible via the internet.

21. The non-transitory computer-readable medium of claim 18, wherein transmitting the location description includes posting the location description to social media.

22. The non-transitory computer-readable medium of claim 18, wherein transmitting the location description includes sending the location description as at least part of an email message or a short message service (SMS) message.

23. The non-transitory computer-readable medium of claim 18, wherein the location description further includes a picture of the vehicle not related to the vehicle's location.

24. The non-transitory computer-readable medium of claim 18, wherein the location description further includes a picture of an owner of the vehicle not related to the vehicle's location.

* * * * *